(12) United States Patent
Kanada

(10) Patent No.: US 10,776,168 B2
(45) Date of Patent: Sep. 15, 2020

(54) VEHICLE AND COMPUTING SYSTEM

(71) Applicant: Toyota Jidosha Kabushiki Kaisha, Toyota-shi, Aichi-ken (JP)

(72) Inventor: Ryo Kanada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 141 days.

(21) Appl. No.: 16/161,582

(22) Filed: Oct. 16, 2018

(65) Prior Publication Data

US 2019/0121661 A1  Apr. 25, 2019

(30) Foreign Application Priority Data

Oct. 20, 2017 (JP) .................. 2017-203936

(51) Int. Cl.
| | |
|---|---|
| *G06F 9/50* | (2006.01) |
| *G07C 5/00* | (2006.01) |
| *B60W 10/26* | (2006.01) |
| *B60L 58/13* | (2019.01) |
| *B60L 50/00* | (2019.01) |
| *B60L 53/00* | (2019.01) |

(Continued)

(52) U.S. Cl.
CPC ............ *G06F 9/505* (2013.01); *B60L 7/10* (2013.01); *B60L 7/20* (2013.01); *B60L 50/00* (2019.02); *B60L 50/10* (2019.02); *B60L 53/00* (2019.02); *B60L 58/00* (2019.02); *B60L 58/10* (2019.02); *B60L 58/12* (2019.02); *B60L 58/13* (2019.02); *B60W 10/26* (2013.01); *B60W 20/12* (2016.01); *B60W 20/13* (2016.01); *G07C 5/008* (2013.01); *H02J 7/14* (2013.01); *H02J 7/143* (2020.01); *H02J 7/1407* (2013.01); *H02J 7/1415* (2013.01); *H02J 7/1423* (2013.01); *H02J 7/1438* (2013.01); *B60L 2260/52* (2013.01); *B60L 2260/54* (2013.01); *H02J 3/322* (2020.01); *Y02T 10/70* (2013.01); *Y04S 30/00* (2013.01); *Y04S 30/10* (2013.01); *Y04S 30/12* (2013.01)

(58) Field of Classification Search
None
See application file for complete search history.

(56) References Cited

U.S. PATENT DOCUMENTS

| | | | | |
|---|---|---|---|---|
| 2012/0084428 | A1* | 4/2012 | Wahl | H02J 3/005 709/223 |
| 2016/0103980 | A1* | 4/2016 | Ricci | G06Q 40/08 726/28 |

FOREIGN PATENT DOCUMENTS

| | | |
|---|---|---|
| JP | 2011120344 A | 6/2011 |
| JP | 2015030407 A | 2/2015 |
| WO | 2015019142 A1 | 2/2015 |

* cited by examiner

*Primary Examiner* — Qing Yuan Wu
(74) *Attorney, Agent, or Firm* — Dinsmore & Shohl LLP

(57) ABSTRACT

A vehicle includes a control device including a first processing section, a second processing section, and a third processing section. The first processing section is programmed to acquire an excessive processing power of a general purpose computing device. The second processing section is programmed to cause the general purpose computing device to process a computing task stored in a first memory storage section and allow the processing result to be stored in a second memory storage section if the excessive processing power acquired by the first processing section is greater than a predetermined processing power. The third processing section is programmed to send the processing result stored in the second memory storage section to an external server by use of a communication device.

9 Claims, 5 Drawing Sheets

(51) Int. Cl.
*B60L 58/12* (2019.01)
*B60L 7/20* (2006.01)
*B60L 50/10* (2019.01)
*B60L 58/00* (2019.01)
*B60L 58/10* (2019.01)
*B60L 7/10* (2006.01)
*B60W 20/12* (2016.01)
*B60W 20/13* (2016.01)
*H02J 7/14* (2006.01)
*H02J 3/32* (2006.01)

VEHICLE AND COMPUTING SYSTEM

CROSS REFERENCE TO RELATED APPLICATIONS

The present application claims priority from Japanese Patent Application No. 2017-203936 filed on Oct. 20, 2017, which is incorporated by reference herein in its entirety.

BACKGROUND

The present disclosure relates to a vehicle and a computing system utilizing the vehicle.

JP 2015-030407 A discloses a movement information processor equipped with an allocation unit that allocates one traveling mode as the travel mode of a moving body to each of the route segments in a traveling path of the moving body, the traveling mode being selected from a plurality of traveling modes with different drive modes. The movement information processor disclosed therein estimates the traveling modes that are selected for the route segments located farther than a predetermined geographic point in the traveling path, and calculates an estimated energy amount necessary to travel the route segment that is estimated to correspond to the selected one of the traveling modes. The publication further discloses that it is determined whether or not a traveling mode can be allocated to each of the segments based on the allocation energy amount that is obtained by subtracting the estimated energy amount from the amount of energy remaining in the power source that is utilized for one of the traveling modes selected for the one of the segments to the predetermined geographic point in the traveling path.

JP 2011-120344 A discloses, for example, a multi-story car park equipped with an electric vehicle charger, in which an inverter provided in its mechanical equipment generates regenerative power during a decelerating operation so that the regenerative power can be used for charging an electric vehicle.

SUMMARY

A vehicle is configured to store the regenerative energy obtained during deceleration into an electrical storage device, such as a secondary battery. However, the electrical storage device is not always able to store all of the regenerative energy. Meanwhile, in motor vehicles, there are increasing needs for development of autonomous driving technology, connectivity with communication network, exchange of information, and so on. Accordingly, the computers (general purpose computing devices) incorporated in motor vehicles tend to have higher processing speed and more versatility.

A vehicle according to the present disclosure includes a general purpose computing device, a communication device, and a control device.

The control device includes a first memory storage section, a second memory storage section, a first processing section, a second processing section, and a third processing section.

The first memory storage section is configured to store a computing task acquired by the communication device from the external server through the communication network.

The second memory storage section is configured to store a processing result processed by the general purpose computing device.

The first processing section is programmed to acquire an excessive processing power of the general purpose computing device.

The second processing section is programmed to cause the general purpose computing device to process the computing task stored in the first memory storage section and store the processing result in the second memory storage section if the excessive processing power acquired by the first processing section is greater than a predetermined processing power.

The third processing section is programmed to send the processing result stored in the second memory storage section to the external server by the communication device.

The vehicle may further include an electrical storage device. In this case, the control device may be programmed to acquire a surplus electric power that is unable to be utilized by the electrical storage device. The second processing section may be programmed to cause the general purpose computing device to process the computing task stored in the first memory storage section if the surplus electric power acquired by the fourth processing section is greater than a predetermined electric power and also the excessive processing power acquired by the first processing section is greater than the predetermined processing power.

In addition, the vehicle may further include an electric generator. In this case, the surplus electric power acquired by the fourth processing section may include a portion of the electric power generated by the electric generator that is unable to be stored in the electrical storage device.

The vehicle may further include a regenerative device incorporating an electric generator. In this case, the surplus electric power acquired by the fourth processing section may include a portion of the electric power generated by the regenerative device that is unable to be stored in the electrical storage device.

In addition, the control device may further include a fifth processing section that predicts a travel route, and a sixth processing section programmed to estimate a regenerative energy that is obtained in the travel route predicted by the fifth processing section. In this case, the surplus electric power acquired by the fourth processing section may include a portion of the electric power stored in the electrical storage device that is to be consumed in advance, based on the regenerative energy estimated by the sixth processing section.

In addition, the vehicle may further include an engine and a mechanism that causes a mechanical power of the engine to drive the electric generator. In this case, the surplus electric power acquired by the fourth processing section may include a portion of electric power generated by causing the mechanical power of the engine to drive the electric generator, the portion of electric power being unable to be stored in the electrical storage device.

The control device may further include a seventh processing section configured to estimate a required electric power required to process the computing task. In this case, the second processing section may be programmed to cause the general purpose computing device to process the computing task if the surplus electric power acquired by the fourth processing section is greater than the required electric power estimated by the seventh processing section.

The control device may further include a third memory storage section, an eighth processing section, a ninth processing section, and a tenth processing section.

The third memory storage section may be configured to associate a reward for the processing result with the computing task stored in the first memory storage section, and store the reward for the processing result.

The eighth processing section may be programmed to estimate a cost B1 that is required when the computing task is processed.

The ninth processing section may be programmed to estimate a cost B2 that is required when the computing task is not processed.

The tenth processing section may be programmed to cause the second processing section to process the computing task if the cost B1 estimated by the eighth processing section is less than the cost B2 estimated by the ninth processing section.

The control device may further include a fourth memory, storage section configured to store a user ID.

In this case, the first memory storage section may be configured to further store a task ID in association with the computing task. The third processing section may be programmed to associate the task ID and the user ID with the processing result and cause the communication device to send, along with the processing result, the associated task ID and the associated user ID to the external server or another external server.

A computing system includes a host server and a communication network connected to the host server. The host server includes a communication device, an A1 memory storage unit, an A2 memory storage unit, an A3 memory storage unit, an A4 memory storage unit, and an A5 memory storage unit, and a payment processing unit.

The communication device may be configured to be data-communicatively connected to a vehicle associated with a predetermined user ID through the communication network.

The A1 memory storage unit may store computing tasks.

The A2 memory storage unit may store task IDs associated with the computing tasks.

The A3 memory storage unit may store task rewards associated with the task IDs.

The A4 memory storage unit may store user IDs.

The A5 memory storage unit may be configured to store one of the user IDs, one of the task IDs, and a processing result for one of the computing tasks in association with each other, all of which are acquired from a vehicle through the communication network.

The payment processing unit may be programmed to identify one of the rewards stored in the A3 memory storage unit based on the one of the task IDs associated with the processing result by the A5 memory storage unit, identify the one of the user IDs associated with the processing result by the A5 memory storage unit, and execute a process for paying the reward.

DETAILED DESCRIPTION

Hereinbelow, various embodiments of a vehicle and a computing system utilizing the vehicle according to the present disclosure will be described. It should be noted, however, that the embodiments described herein are, of course, not intended to limit the present invention. The present invention is not limited to the embodiments described herein unless specifically stated otherwise.

Figure 1:
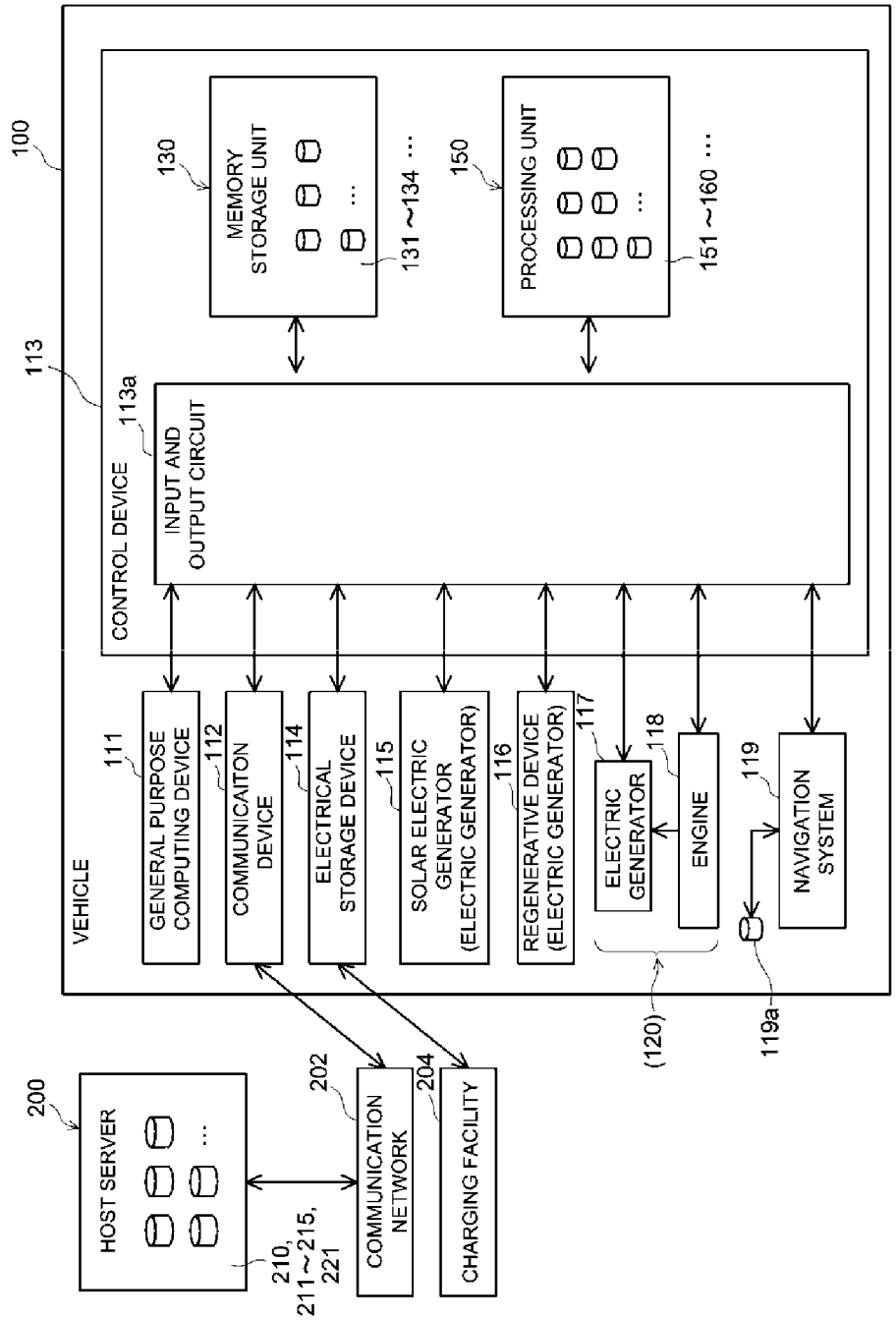
FIG. 1 is a block diagram schematically illustrating an embodiment of a vehicle and a computing system using the vehicle.

FIG. 1 is a block diagram schematically illustrating an embodiment of a vehicle and a computing system utilizing the vehicle.

As illustrated in FIG. 1, a vehicle 100 includes a general purpose computing device 111, a communication device 112, a control device 113, an electrical storage device 114, a solar electric generator 115 (electric generator), a regenerative device 116 (electric generator), an electric generator 117, an engine 118, and a navigation system 119. Of these, each of the solar electric generator 115, the regenerative device 116, and the electric generator 117 may be an exemplary embodiment of electric generator.

The general purpose computing device 111 may be, for example, a general purpose computing device that is carried onboard a vehicle. The computing devices that are carried onboard a vehicle are often referred to as CPU, GPU, and ECU, for example. Among such computing devices, the general purpose computing device 111 refers to a device that may be used for versatile purposes. It is often the case that some of the computing devices employed in motor vehicles may be a general purpose computing device 111 that is highly versatile and exhibits high processing performance. The development of autonomous driving technology and the advancement of automotive information technology have increased the diversity and amount of information processing in motor vehicles. Accordingly, the versatility and processing performance of the computing devices incorporated in motor vehicles have increased. It is also expected that the versatility and processing performance of the computing devices incorporated in motor vehicles will continue to improve in the future. The general purpose computing device 111 may be either a single computing device or a plurality of computing devices. When the vehicle incorporates a plurality of general purpose computing devices, it is also possible that the plurality of general purpose computing devices may be allowed to perform parallel computing. When this is the case, the general purpose computing device 111 may include a device in which the plurality of general purpose computing devices are combined together.

The communication device 112 herein is a device for connecting with an external communication network 202, such as the Internet. The vehicle 100 should preferably be connected with the external communication network 202, such as the Internet, through a communication service provided by a mobile communication provider or a tethering service provided by a user's mobile phone, for example. The communication device 112 enables the vehicle 100 to be connected to an external server 200 via the communication network 202 so as to allow bidirectional communication therebetween.

In this vehicle 100, the control device 113 is a device that controls various processes, such as causing the general purpose computing device 111 to process a computing task and causing the communication device 112 to transmit a processing result to the external server 200. Herein, the computing task is not limited to arithmetic calculation, but may broadly include, in computer processing, various information processing that can cause a computational workload on a computer.

Herein, the control device 113 includes a memory storage device that stores information and a processing device that processes information. Various functions of the control device 113 may be implemented by a cooperative combination of hardware and a computer that executes predetermined programs. The control device 113 preferably includes, for example, an interface (I/F) that receives data or the like from external devices, a central processing unit (CPU) that executes instructions of control programs, a ROM that stores programs to be executed by the CPU, a RAM that is used as a working area for deploying the programs, and a memory storage device (or a memory storage medium), such as a memory, that stores the foregoing programs and various data.

The electrical storage device 114 is a device that is carried onboard the vehicle 100 to store electric power. The electrical storage device 114 may include a secondary battery, such as a lithium-ion secondary battery, and an electrical storage device, such as a lithium-ion capacitor.

In this embodiment, the vehicle 100 is furnished with the engine 118. The engine 118 is a device that obtains mechanical power from fuel. Examples include gasoline engines and diesel engines. Examples of the vehicle 100 herein include electric vehicles (EV), hybrid vehicles, and plug-in hybrid electric vehicles. When the vehicle 100 is an electric vehicle, the vehicle 100 is not equipped with the engine 118. As in such cases, it is possible that the vehicle 100 may not be equipped with the engine.

The vehicle 100 may be connected to the external server 200 through the communication network 202, such as the Internet. The external server 200 is a computer that functions as a host server of a computing system 1000 that utilizes the vehicle 100 of the present disclosure. The external server 200 includes a memory storage device that stores information and a processing device that processes information. Various functions of the external server 200 may be implemented by a cooperative combination of hardware and a computer that executes predetermined programs. In the computing system of the present disclosure, the external server 200 may be referred to as a "host server 200" when appropriate.

As illustrated in FIG. 1, the control device 113 of the vehicle 100 includes a memory storage unit 130 that stores information, and a processing unit 150 that processes information. The memory storage unit 130 includes a first memory storage section 131 to a fourth memory storage section 134. The processing unit 150 includes processing modules including a first processing section 151 to a tenth processing section 160. The control device 113 is connected to various devices 111 to 119 of the vehicle 100 via an input and output circuit 113*a* so that it can exchange information and control signals with the various devices 111 to 119.

The first memory storage section 131 is configured to store computing tasks acquired by the communication device 112 from the external server 200 via the communication network 202. In this embodiment, the first memory storage section 131 stores a computing task, and a task ID, which is the information for identifying the computing task.

The second memory storage section 132 is configured to store a processing result processed by the general purpose computing device 111.

The third memory storage section 133 is configured to associate a reward for the processing result with the computing task stored in the first memory storage section 131, and store the reward for the processing result.

The fourth memory storage section 134 is configured to store a user ID.

The first processing section 151 is programmed to acquire an excessive processing power of the general purpose computing device 111.

The second processing section 152 is programmed to cause the general purpose computing device 111 to process the computing task stored in the first memory storage section 131 if the excessive processing power acquired by the first processing section 151 is greater than a predetermined processing power. The second processing section 152 is also programmed to store the processing result in the second memory storage section 132.

The third processing section 153 is programmed to cause the communication device 112 to send the processing result stored in the second memory storage section 132 to the external server 200 or another external server (not shown).

Thus, the vehicle 100 of the present disclosure is programmed to cause the general purpose computing device 111 to process a computing task if the general purpose computing device 111 has an excessive processing power that is greater than a predetermined processing power. By processing such a computing task, it is possible to effectively utilize surplus processing power of the general purpose computing device 111 of the vehicle 100.

Figure 2:
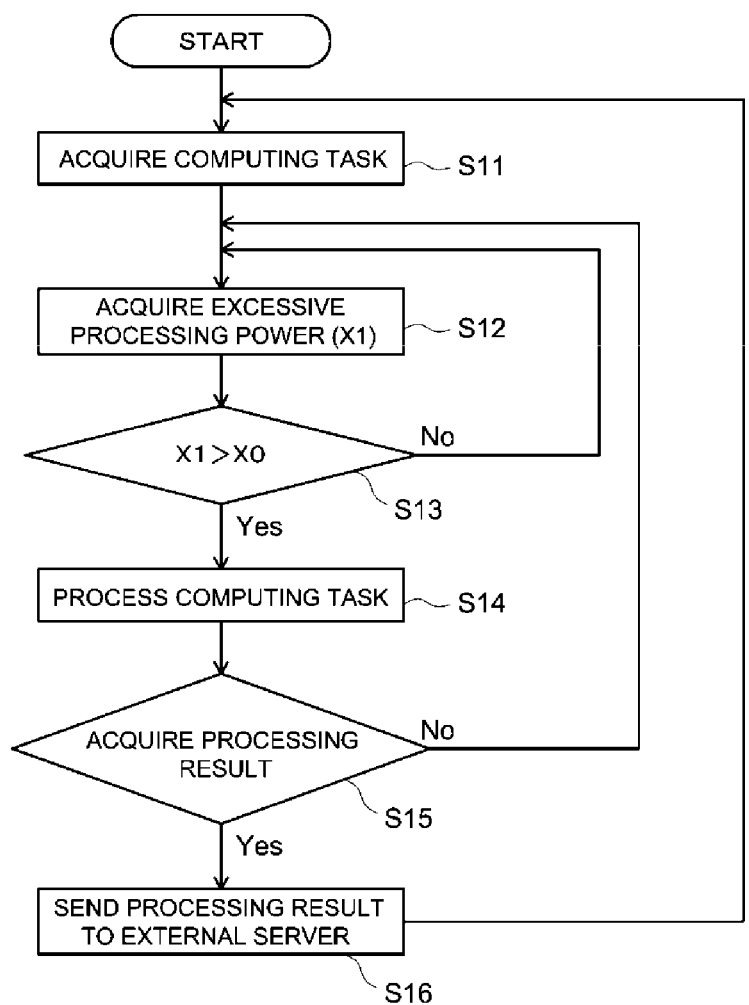
FIG. 2 is a flowchart illustrating an example of a process flow executed by a first processing section 151 to a third processing section 153.

FIG. 2 is a flowchart illustrating an example of a process flow executed by the first processing section 151 to the third processing section 153.

As illustrated in FIG. 2, first, the vehicle 100 is connected to the external server 200 (see FIG. 1) by the communication device 112 to acquire a computing task (S11).

Next, the excessive processing power of the general purpose computing device 111 is acquired (S12). Herein, the excessive processing power is assumed to be X1.

Then, it is determined whether the excessive processing power (X1) is greater than a predetermined processing power (X0) or not (S13). If the excessive processing power (X1) is not greater than the predetermined processing power (X0) (No), the process returns to the step (S12) of acquiring the excessive processing power of the general purpose computing device 111, and it is determined whether the excessive processing power (X1) is greater than the predetermined processing power (X0) or not (S13).

If the excessive processing power (X1) is greater than a predetermined processing power (X0) (Yes), the computing task is processed (S14). In other words, if X1>X0 in the determination whether X1>X0, the general purpose computing device 111 executes the step of processing the computing task. It is possible that the computing task may necessitate a large amount of processing and require a considerable amount of time. The processes for the computing task are executed when the excessive processing power (X1) of the general purpose computing device 111 is greater than the predetermined processing power (X0).

For this reason, this flow is programmed so that it is determined whether a processing result has been obtained for the computing task after a predetermined time (S15).

If a processing result has not been obtained for the computing task (No) in the determination (S15), the process returns to the step (S12) of acquiring the excessive processing power of the general purpose computing device 111. Then, it is determined whether the excessive processing power (X1) is greater than the predetermined processing power (X0) or not (S13). Then, if the excessive processing power (X1) is greater than a predetermined processing power (X0) (Yes), the computing task continues to be processed (S14). Thus, if the excessive processing power (X1) of the general purpose computing device 111 is greater than the predetermined processing power (X0), the processing is executed. On the other hand, if the excessive processing power (X1) of the general purpose computing device 111 is not greater than the predetermined processing power (X0) (No), the processing is interrupted.

Then, if a processing result is obtained in the determination (S15), the processing result is transmitted to the external server 200 (S16). At this time, it is preferable that the task ID and the user ID, along with the processing result, be transmitted to the external server 200. Thus, when the general purpose computing device 111 has an excessive processing power, the vehicle 100 of the present disclosure is able to process a computing task acquired from the external server 200 and send the processing result thereto. This makes it possible to effectively utilize the excessive processing power of the general purpose computing device 111. It is possible that this flow may be started after the electric power source of the vehicle 100 is turned on. It is also possible that, when the electric power source of the vehicle 100 is turned off, the processing may be interrupted so that the flow is stopped.

Herein, the processing power of the general purpose computing device 111 of the vehicle 100 may be determined by, for example, a clock frequency. The term "predetermined processing power" means a processing power that is predetermined to judge whether the general purpose computing device 111 has an extra processing power or not, and it is a threshold value to determine whether the general purpose computing device 111 has an extra processing power or not. Herein, the predetermined processing power may be set to, for example, 50%, 60%, 70%, or 80% of the processing power of the general purpose computing device 111. Accordingly, the phrase "the excessive processing power of the general purpose computing device 111 is greater than a predetermined processing power" means that, for example, in the case where the "predetermined processing power" is set to 70% of the processing power of the general purpose computing device 111, the general purpose computing device 111 has an excessive processing power of higher than 70%, and therefore, it may be judged that the general purpose computing device 111 has an excess of processing power that is higher than 70%.

More specifically, even when the vehicle 100 is in a normal drive mode, the general purpose computing device 111 is performing some kind of computation (i.e., information processing). Even when the general purpose computing device 111 is performing the processing for the normal drive mode, it may be able to further perform additional processing in parallel if the general purpose computing device 111 has a sufficiently high processing speed. On the other hand, when the general purpose computing device 111 is performing more complicated processing, such as processing for autonomous driving in a city area, it is possible that the general purpose computing device 111 may be using a high proportion of its processing power, even though the general purpose computing device 111 has a sufficiently high processing speed. It is desirable that the control device 113 be programmed to set the "predetermined processing power" to an appropriate level so that it is determined that there is no more excessive processing power when a high proportion of the processing power of the general purpose computing device 111 is being used.

Such a computing task is acquired from the external server 200 through the communication network 202 by the communication device 112. As will be detailed later, the computing task may be such that a reward can be obtained for a processing result that is sent to the external server 200. In this embodiment, the third processing section 153 is programmed to associate the processing result with the task ID and the user ID stored in the fourth memory storage section 134, and send, along with the processing result, the task ID and the user ID to the external server 200 or another predetermined external server. This enables the external server 200 to identify the computing task based on the task ID and also identify the user based on the user ID. This allows the administrator who manages the external server 200 to construct a system that pays a predetermined reward for the processing result to the user corresponding to the computing task. Here, the external server that receives the processing result from the vehicle 100 may be a different server from the external server 200 that provides the computing task to the vehicle 100.

The vehicle 100 includes the electrical storage device 114. Overcharging of the electrical storage device 114 may become a detrimental factor for the battery performance. The fourth processing section 154 is programmed to acquire a surplus electric power that is unable to be utilized by the electrical storage device 114.

When such a fourth processing section 154 is provided, the second processing section 152 may preferably be programmed to cause the general purpose computing device 111 to process a computing task stored in the first memory storage section 131 if the surplus electric power acquired by the fourth processing section 154 is greater than a predetermined electric power and the excessive processing power acquired by the first processing section 151 is greater than a predetermined processing power.

Figure 3:
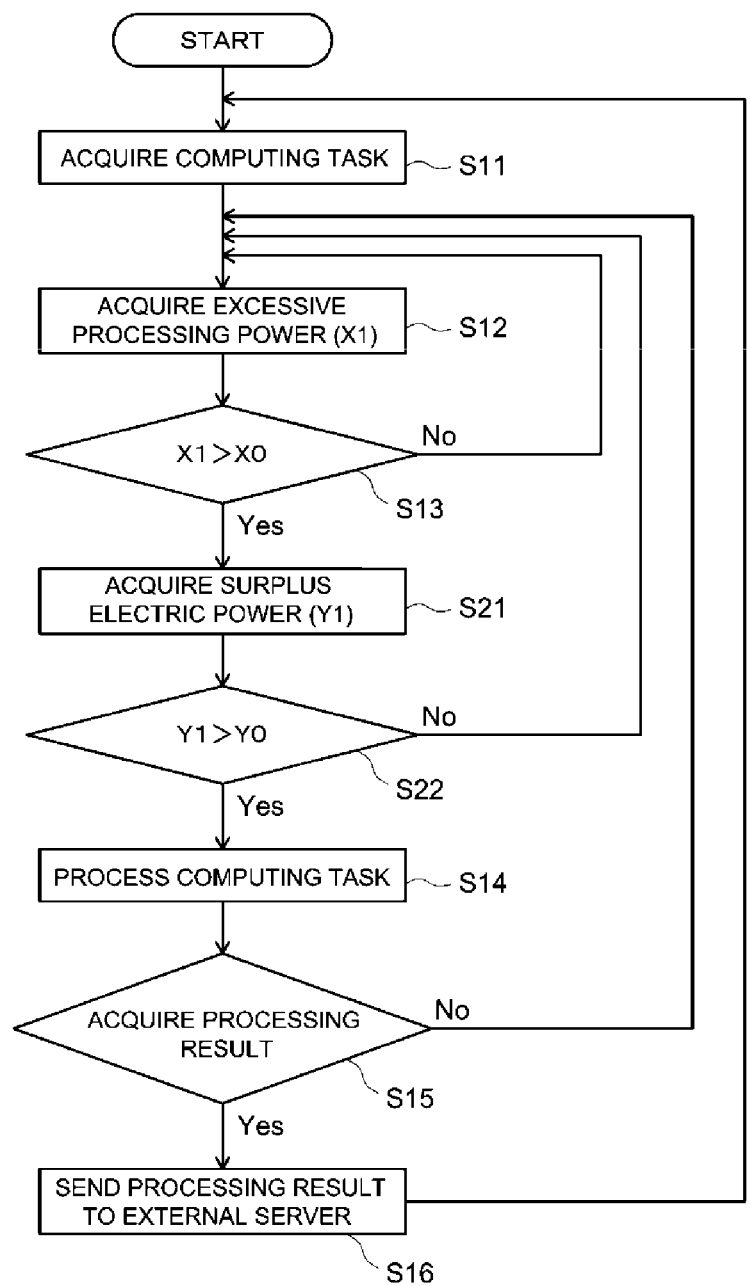
FIG. 3 is a flowchart illustrating an example of a process flow including a process executed by a fourth processing section 154.

FIG. 3 is a flowchart illustrating an example of a process flow including a process executed by the fourth processing section 154. In FIG. 3, the same process steps as those shown in FIG. 2 are indicated by the same reference characters.

In the flowchart of FIG. 3, the fourth processing section 154 is programmed to acquire a surplus electric power (Y1) (S21), if the excessive processing power (X1) is greater than the predetermined processing power (X0) (Yes) in the step (S13) of determining whether the excessive processing power (X1) is greater than the predetermined processing power (X0) or not. Then, it is determined whether the surplus electric power (Y1) is greater than a predetermined electric power (Y0) or not (S22).

If the surplus electric power (Y1) is not greater than the predetermined electric power (No), the process returns to the step (S12) of acquiring the excessive processing power of the general purpose computing device 111, and it is determined whether the excessive processing power (X1) is greater than the predetermined processing power (X0) or not (S13). On the other hand, if the excessive processing power (X1) is greater than the predetermined processing power (X0) (Yes), the surplus electric power (Y1) is acquired again, and it is determined whether the acquired surplus electric power (Y1) is greater than the predetermined electric power (Y0) or not (S22). Then, if the acquired surplus electric power (Y1) is greater than the predetermined electric power (Y0) (Yes) in the determination (S22), the computing task is processed (S14).

Thus, according to the process flow illustrated in FIG. 3, the general purpose computing device 111 processes a computing task stored in the first memory storage section 131 if the excessive processing power acquired by the first processing section 151 is greater than a predetermined processing power and also the surplus electric power acquired by the fourth processing section 154 is greater than a predetermined electric power. In the process flow illustrated in FIG. 3, it is first determined whether or not the excessive processing power acquired by the first processing section 151 is greater than a predetermined processing power, and thereafter, it is determined whether or not the surplus electric power acquired by the fourth processing section 154 is greater than a predetermined electric power. The process flow including the process executed by the fourth processing section 154 is not limited to this sequence. For example, it may be first determined whether or not the surplus electric power acquired by the fourth processing section 154 is greater than a predetermined electric power, and thereafter, it may be determined whether or not the excessive processing power acquired by the first processing section 151 is greater than a predetermined processing power.

In this case, it is desirable that the general purpose computing device 111 be configured to process a computing task stored in the first memory storage section 131 if the surplus electric power acquired by the fourth processing section 154 is greater than a predetermined electric power and also the excessive processing power acquired by the first processing section 151 is greater than a predetermined processing power. That is, it is desirable that the general purpose computing device 111 be configured to process a computing task if the general purpose computing device 111 has a sufficient surplus electric power to execute the task and also the general purpose computing device 111 has a sufficient excessive processing power. This means that, when a surplus electric power that is unable to be utilized by the electrical storage device 114, the general purpose computing device 111 utilizes the surplus electric power to process a computing task. In other words, the general purpose computing device 111 may be configured to consume the surplus electric power that is unable to be utilized by the electrical storage device 114. This makes it possible to effectively utilize the regenerative energy that is unable to be stored in the electrical storage device 114.

As illustrated in FIG. 1, for example, when the vehicle 100 is an electric vehicle or a plug-in hybrid electric vehicle, which is driven by electric power, the vehicle 100 is connected to a charging facility 204 while parked, and the electrical storage device 114 is charged. In such a case, in order to prevent the electrical storage device 114 from being overcharged while the electric vehicle is parked, the general purpose computing device 111 may be configured to process a computing task at an appropriate time to consume electric power. In this case, for example, it is desirable that, while monitoring the state of charge of the electrical storage device 114, the general purpose computing device 111 should process a computing task at an appropriate time to consume electric power so that the amount of charge of the electrical storage device 114 can be adjusted.

For example, as illustrated in FIG. 1, when the vehicle 100 is provided with an electric generator, the surplus electric power acquired by the fourth processing section 154 includes a portion of the electric power generated by the electric generator that is unable to be stored in the electrical storage device 114. For example, when the vehicle 100 is provided with the solar electric generator 115, the solar electric generator 115 can generate electric power while the vehicle 100 is parked. In this case, it is possible that, even after the electrical storage device 114 is fully charged, the solar electric generator 115 may continue to generate electric power. In such a case, it is possible that electric power that is unable to be stored in the electrical storage device 114 may be produced. In this case, it is desirable that the fourth processing section 154 employ the electric power that is unable to be stored in the electrical storage device 114 as the surplus electric power. Although it has been described that the vehicle 100 includes the solar electric generator 115, the solar electric generator 115 may be optional. The vehicle 100 may not be provided with the solar electric generator 115 when the solar electric generator 115 is not specifically mentioned.

In addition, the vehicle 100 may further include a regenerative device 116 incorporating an electric generator, as illustrated in FIG. 1. In this case, the surplus electric power acquired by the fourth processing section 154 includes a portion of the electric power generated by the regenerative device 116 that is unable to be stored in the electrical storage device 114.

Figure 4:
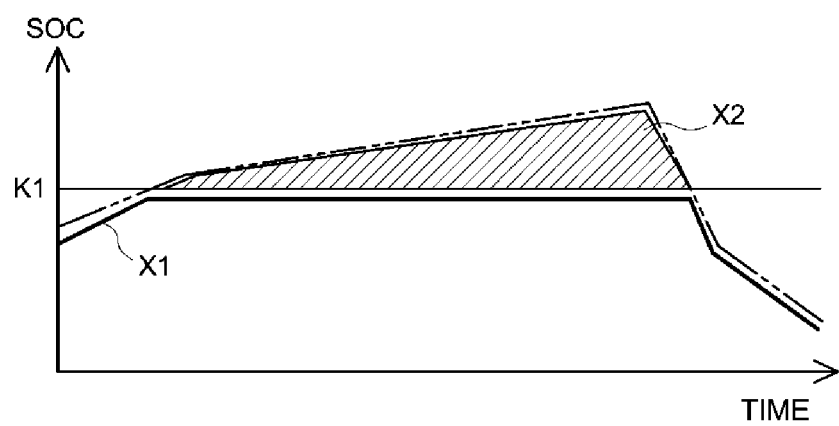
FIG. 4 is a graph illustrating changes in the charge level X1 of an electrical storage device 114 at a long downhill.

The vehicle 100 may in some cases incorporate the regenerative device 116, which incorporates an electric generator and generates electric power utilizing the regenerative energy during deceleration. FIG. 4 is a graph illustrating changes in the charge level X1 of the electrical storage device 114 at a long downhill. As shown in FIG. 4, the capacity of the electrical storage device 114 has an upper limit K1. When the vehicle 100 descends a long downhill, a large amount of regenerative energy may be obtained because the vehicle 100 is decelerated intermittently while descending the long downhill. When the vehicle 100 is driven on a long downhill, the electric power generated by the regenerative device 116 is stored in the electrical storage device 114. Accordingly, the charge level X1 of the electrical storage device 114 gradually increases. When the charge level X1 of the electrical storage device 114 reaches a predetermined upper limit K1 of the capacity of the electrical storage device 114, charging is stopped. Then, the regenerative energy is no longer stored into the electrical storage device 114. This means that all the produced regenerative energy may not be stored in the electrical storage device 114. In this case, it is desirable that the fourth processing section 154 should estimate the electric power X2 (the electric power corresponding to the hatched area in FIG. 4) that is unable to be stored in the electrical storage device 114, and employ the electric power X2 as a surplus electric power.

In this case, the control device 113 may further include a fifth processing section 155 that predicts a travel route, and a sixth processing section 156 programmed to estimate a regenerative energy that is obtained in the travel route predicted by the fifth processing section 155. In this case, the surplus electric power acquired by the fourth processing section 154 may include a portion of the electric power stored in the electrical storage device 114 that is to be consumed in advance, based on the regenerative energy estimated by the sixth processing section 156.

The fifth processing section 155 is programmed to predict a travel route. The process for predicting a travel route may utilize map information and a technology established for the navigation system 119 that calculates a route of the vehicle, for example, as illustrated in FIG. 1. The travel route on which the vehicle travels may be predicted based on, for example, the destination of the vehicle, map information, and road traffic information. In the example shown in FIG. 1, the navigation system 119 is built into the vehicle 100.

The navigation system 119 is configured to acquire positional information from a GPS receiver 119a carried onboard the vehicle 100.

The sixth processing section 156 is programmed to estimate a regenerative energy obtained in the predicted travel route. For example, when the vehicle 100 is expected to follow a route that contains a long stretch of downhill, it is expected that the vehicle 100 is driven while being decelerated intermittently. In this case, it is possible that only a small amount of the electric power stored in the electrical storage device 114 may be consumed, so a large amount of regenerative energy may be obtained. Charging of the electrical storage device 114 beyond a predetermined charge level results in overcharging, which may be a cause of performance deterioration of the electrical storage device 114. For this reason, all the regenerative energy may not be stored therein.

In this case, the fourth processing section 154 may acquire a portion of the electric power stored in the electrical storage device 114 that is to be consumed in advance, based on the regenerative energy estimated by the sixth processing section 156. That is, it is desirable that the fourth processing section 154 include a program that estimates an amount of regenerative energy that is unable to be fully stored in the electrical storage device 114.

For example, the map information or the navigation system may associate geographic points on the map with expected values of the regenerative energy expected to be obtained at the geographic points, and store the geographic points and the associated expected values. The information on such geographic points and expected values for regenerative energy may be collected by the external server 200 and the like as big data obtained from traveling vehicles. The collected information may be associated and recorded with map information. It is desirable that the sixth processing section 156 be programmed to estimate the regenerative energy expected to be obtained in the predicted travel route, from information such as the expected values for the regenerative energy that are associated and recorded with the map information.

For example, when the vehicle 100 is expected to follow a route that contains a long stretch of downhill, it is possible to estimate the regenerative energy expected to be obtained in advance. In this case, the fourth processing section 154 calculates a portion of the electric power stored in the electrical storage device 114 that is to be consumed in advance, before the vehicle reaches the downhill. Then, it should employ the electric power that has been calculated as the portion of the electric power to be consumed in advance as the surplus electric power.

Although the foregoing description has explained an example in which the vehicle 100 is provided with the regenerative device 116 incorporating an electric generator, it is also possible that the vehicle 100 may not be provided with the regenerative device 116 when the regenerative device 116 is not specifically mentioned. Moreover, it is also possible that, when the vehicle 100 is provided with the regenerative device 116 incorporating an electric generator, the vehicle 100 further include the solar electric generator 115.

When the vehicle 100 is provided with an engine 118 (what is called an internal combustion engine) and a mechanism in which the mechanical power of the engine 118 drives the electric generator 117, the surplus electric power acquired by the fourth processing section 154 may include a portion of the electric power generated by causing the mechanical power of the engine 118 to drive the electric generator 117, the portion being unable to be stored in the electrical storage device 114.

Here, the electric generator 117 driven by the mechanical power of the engine 118 may include what is called an alternator. The vehicle 100 may include a system in which the mechanical power of the engine 118 drives the electric generator, such as a series-hybrid system. The vehicle 100 may include a system in which a portion of the mechanical power of the engine 118 drives the electric generator 117 through a power-split device, such as what is called a power-split hybrid system.

For example, charging and discharging of the electrical storage device 114 may be restricted under a low temperature environment below −15° C., in order to prevent the battery performance from deteriorating. In such a case, a hybrid electric vehicle including a mechanism for charging the electrical storage device 114 by operating the electric generator 117 by use of the mechanical power of the engine 118, for example, may be controlled in such a manner that the output power delivered from the electrical storage device 114 is lowered and the vehicle is started by the mechanical power of the engine 118. Furthermore, charging and discharging of the electrical storage device 114 may be restricted until the electrical storage device 114 is heated to a predetermined temperature or higher after stating up the engine 118. As described above, there may be a situation in which the electrical storage device 114 is unable to store a portion of the electric power generated by the electric generator 117 operated by the output power of the engine 118. In such a case, it is desirable that the surplus electric power acquired by the fourth processing section 154 include a portion of the electric power generated by causing the mechanical power of the engine 118 to operate the electric generator 117 that is unable to be stored in the electrical storage device 114.

In cases where the vehicle is provided with a mechanism for generating electric power from the mechanical power of the engine 118 and adjusting the charge level of the electrical storage device 114, such as in hybrid electric vehicles, it is desirable that the electrical storage device 114 be adjusted to a state of charge at which charging and discharging can be performed efficiently. In such a case, the general purpose computing device 111 may be programmed to process a computing task at an appropriate time in order to adjust the charge level of the electrical storage device 114 to a state of charge at which charging and discharging can be performed efficiently. That is, in order to adjust the charge level of the electrical storage device 114 to a state of charge that achieves high charge and discharge efficiency, it is possible to utilize the general purpose computing device 111 as one of the targets at which the surplus electric power is released from the electrical storage device 114.

For example, when it is desired to adjust the SOC of the electrical storage device 114 to be within the range of 50% to 70%, it is possible to cause the general purpose computing device 111 to process a computing task when the SOC of the electrical storage device 114 is higher than 70% so that the charge state of the electrical storage device 114 can be adjusted to lower than 70% by discharging the electrical storage device 114. This means that, when the SOC of the electrical storage device 114 is higher than 70%, the electric power generated by driving the electric generator 117 with the mechanical power of the engine 118, or the electric power generated by the regenerative device 116, may be a portion of electric power that is unable to be stored in the electrical storage device 114. When this is the case, it is desirable that the surplus electric power acquired by the fourth processing section 154 include a portion of the electric power generated by causing the mechanical power of the engine 118 to drive the electric generator 117, or a portion of the electric power generated by the regenerative device 116, that is unable to be stored in the electrical storage device 114.

As described above, in order to adjust the electrical storage device 114 to be within a predetermined SOC range, the surplus electric power acquired by the fourth processing section 154 may include the electric power that is unable to be stored in the electrical storage device 114. As a means for adjusting the SOC of the electrical storage device 114 to be within a predetermined range, the general purpose computing device 111 may be programmed to process a computing task by use of such a surplus electric power. As a result, the electrical storage device 114 is adjusted to be within a predetermined SOC range. This enables the electrical storage device 114 to perform efficient charging and discharging. Also, it is possible to prevent the electrical storage device 114 from deterioration and prolong the life time of the electrical storage device 114.

In addition, for example, it is often the case with controlling of series connected cells that, when variations occur in the voltages of the series connected cells, only the cells with higher voltages are discharged so that the variations between the cells can be adjusted. The surplus electric power acquired by the fourth processing section 154 may include the electric power discharged in such a situation.

Moreover, when the vehicle 100 is a fuel cell vehicle, a fuel cell 120 is incorporated in place of the engine 118 and the electric generator 117 as shown in FIG. 1. In this case, the electric power generated by the fuel cell 120 is stored in the electrical storage device 114. The electric power stored in the electrical storage device 114 drives a motor to move the vehicle. In this case as well, it is desirable that the SOC of the electrical storage device 114 should be adjusted to be within a predetermined range. From such a viewpoint, as a means for adjusting the SOC of the electrical storage device 114 to be within a predetermined range, the control device 113 may be programmed to cause the general purpose computing device 111 to process a computing task at an appropriate time. That is, processing of a computing task by the general purpose computing device 111 may be utilized as a target of discharge of the electrical storage device 114 when adjusting the SOC of the electrical storage device 114.

When this is the case, it is possible that the surplus electric power acquired by the fourth processing section 154 may include a portion of the electric power generated by the fuel cell 120, or a portion of the electric power generated by the regenerative device 116, that is not stored in the electrical storage device 114 for the purpose of adjusting the electrical storage device 114 to be within a predetermined SOC range. Thus, the process of causing the general purpose computing device 111 to process a computing task may also be applied to fuel cell vehicles.

The foregoing description has explained examples in which the vehicle 100 is provided with an engine 118 (what is called an internal combustion engine) in addition to either the mechanism in which the mechanical power of the engine 118 drives the electric generator 117, or the fuel cell 120. The vehicle 100 may include an electric automotive vehicle. The engine 118, the mechanism in which the mechanical power of the engine 118 drives the electric generator 117, and the fuel cell 120, for example, may be optional. Where the engine 118, the mechanism in which the mechanical power of the engine 118 drives the electric generator 117, and the fuel cell 120 are not specifically mentioned, the vehicle 100 may not necessarily include these elements. Moreover, it is also possible that the vehicle 100 including the engine 118, the mechanism in which the mechanical power of the engine 118 drives the electric generator 117, or the fuel cell 120 may further include a regenerative device 116 incorporating an electric generator and/or a solar electric generator 115.

Hereinabove, various examples of the surplus electric power that may be acquired by the fourth processing section 154 as the surplus electric power that is unable to be utilized by the electrical storage device 114 have been described. The second processing section 152 may be configured to allow the general purpose computing device 111 to process a computing task stored in the first memory storage section 131 if a surplus electric power is produced. When processing the computing task, the general purpose computing device 111 consumes electric power. This makes it possible to effectively utilize the surplus electric power that is unable to be utilized by the electrical storage device 114. It is also possible that the second processing section 152 may be configured to be able to control the computational workload on the general purpose computing device 111 to thereby adjust the electric power consumed by the general purpose computing device 111.

A seventh processing section 157 is programmed to estimate a required electric power required to process a computing task. The required electric power required to process a computing task can be estimated, for example, according to the equation: Required electric power (Wh)=Electric power (W)×Time (T).

Here, electric power (W) is dependent on, for example, the clock rate or hardware.

Time (T) may be obtained according to the following equation (1), for example.

$$\text{Time }(T)=\text{Length of calculation step/[Instructions per clock }(n/\text{Hz})]/\text{Clock rate]} \quad (1)$$

Here, the parameter [Instructions per clock (n/Hz)]/Clock rate] represents the amount of processing per second. Instructions per clock (n/Hz) is dependent on the computation model and hardware.

For example, when the specification of hardware carried onboard the vehicle is known, the range in which the hardware carried onboard the vehicle achieves efficient power consumption per clock is also known.

The equation (1) can be replaced with the following equation (2). From Time (T), it is possible to estimate the time required for the calculation.

$$\text{Time }(T)=[\text{Length of calculation step/Instructions per clock }(n/\text{Hz})]/\text{Clock rate} \quad (2)$$

The calculation for estimating Time (T) may be programmed to be performed either by the general purpose computing device 111 incorporated in the vehicle 100 or by the external server 200.

When the external server 200 performs calculation for estimating Time (T), the program may be such that predetermined information necessary for estimating Time (T) is sent from the vehicle 100 to the external server 200. For example, information such as unique identification code indicating the specification of the general purpose computing device 111 carried onboard the vehicle 100, surplus electric power, and clock rate should preferably be sent to the external server 200. Alternatively, the information such as the specification of the general purpose computing device 111 carried onboard the vehicle 100 may be associated with information for identifying the vehicle 100 and stored in a database of the external server 200 in advance.

Based on such information, the external server 200 may be programmed to provide the vehicle 100 with computing tasks that can be calculated by vehicle 100 with the surplus electric power. In this case, it may be programmed to provide the vehicle 100 with one that results in the greatest reward, among the computing tasks that can be calculated by vehicle 100 with the surplus electric power.

It is desirable that the second processing section 152 be programmed to process the computing task if the surplus electric power acquired by the fourth processing section 154 is greater than the required electric power estimated by the seventh processing section 157. In this case, it is determined whether the computing task can be processed by the surplus electric power without being interrupted, and the processing is executed if it is determined that the computing task can be processed by the surplus electric power without being interrupted. Thus, because the computing task is processed using the surplus electric power without being interrupted, it is possible to obtain the processing result efficiently by utilizing the surplus electric power.

It should be noted that, when the first memory storage section 131 stores a plurality of computing tasks that require different electric powers to process the tasks, it is desirable that the seventh processing section 157 compute the required electric power for each of the plurality of computing tasks stored in the first memory storage section. 131, and associate and store the computed required electric power with the corresponding computing task. The second processing section 152 may be programmed to select and execute one of the computing tasks stored in the first memory storage section 131, the required electric power of which that is estimated by the seventh processing section 157 is smaller than the surplus electric power acquired by the fourth processing section 154.

In some cases, the computing task may have a deadline by which the processing needs to be completed. In this case, it is preferable to associate and store deadlines by which processing need to be completed with a plurality of computing tasks stored in the first memory storage section 131. In this case, the second processing section 152 may determine the sequence in which processing should be executed for a plurality of computing tasks stored in the first memory storage section 131 so that ones with earlier deadlines can be completed earlier. When no deadline is set, it is possible to determine the sequence for processing the computing tasks in the order in which the vehicle 100 has received the computing tasks from the external server 200.

An eighth processing section 158 is programmed to estimate a cost B1 that is required when a computing task is processed.

A ninth processing section 159 is programmed to estimate a cost B2 that is required when the computing task is not processed.

A tenth processing section 160 is programmed to cause the second processing section 152 to process a computing task if the cost B1 estimated by the eighth processing section 158 is less than the cost B2 estimated by the ninth processing section 159, i.e., if B1<B2.

For example, in cases where a reward is obtained for a processing result, it may be more beneficial for the user to obtain the reward by allowing the vehicle to execute the processing. The reward for the processing result is preferably received by the vehicle 100 from the external server 200 in association with the computing task and stored in the third memory storage section 133.

For example, in cases where the vehicle is provided with a mechanism that is able to adjust the charge level by generating electric power from the mechanical power of an engine, such as in hybrid electric vehicles, it may be in some cases more beneficial to consume the fuel by driving the engine and generating electric power from a portion of the mechanical power and at the same time cause the general purpose computing device 111 to execute the processing to obtain the reward.

In cases of plug-in hybrid electric vehicles and electric vehicles, when the vehicle is charged from a charging facility while parked, it may be more beneficial to obtain the reward by causing the general purpose computing device 111 to execute the processing utilizing a portion of the electric power stored in the vehicle. That is, even when the electrical storage device 114 approaches the fully charged state, there are cases where it is more beneficial to continue the charging and allow the general purpose computing device 111 to execute the processing to obtain the reward.

In such cases, it is desirable that the control device is programmed to estimate the cost B1, which is required when the computing task is processed, also estimate the cost B2, which is required when the computing task is not processed, and cause the second processing section 152 to execute the processing if B1<B2.

Here, the cost B1, which is required when the computing task is processed, may be calculated by: (Fuel cost required for driving)+(Fuel cost required for the processing)−(Reward obtained for the processing).

The cost B2, which is required when the computing task is not processed, may be obtained as the fuel cost required for driving.

Figure 5:
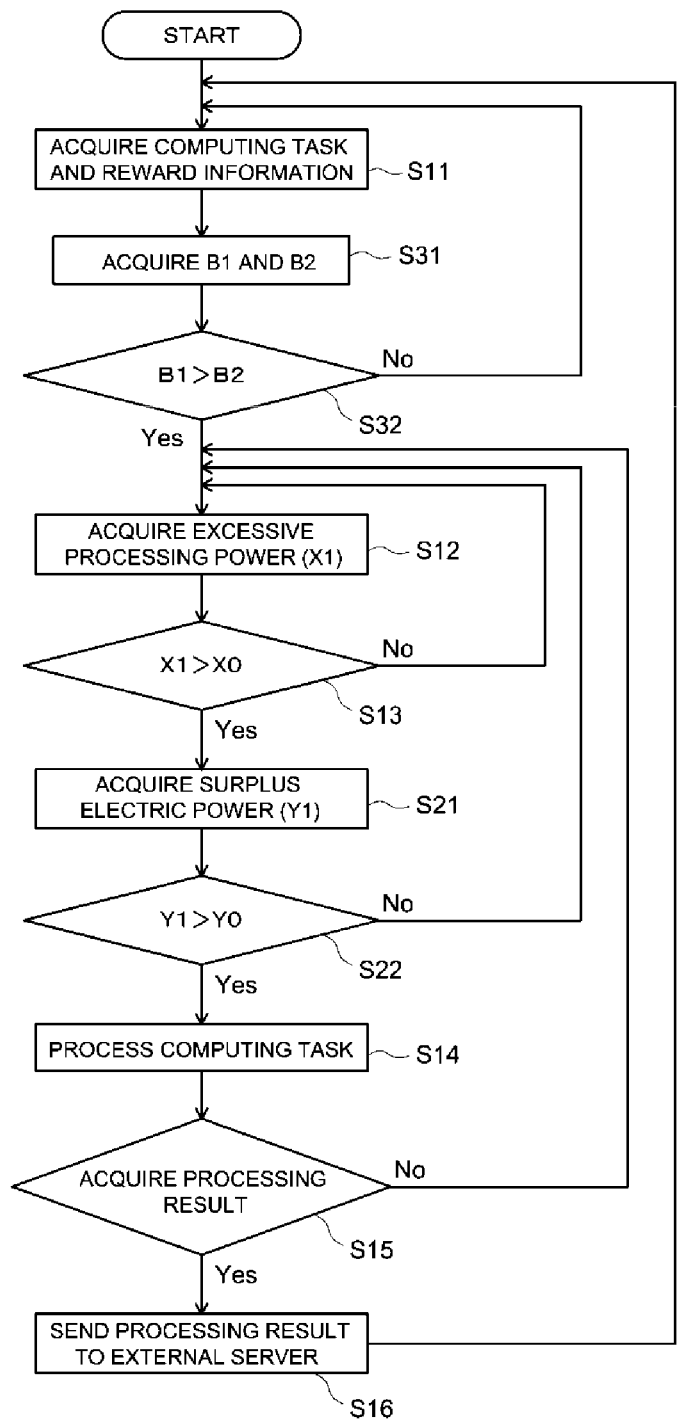
FIG. 5 is a flowchart illustrating an example of a process flow including steps executed by an eighth processing section 158 to a tenth processing section 160.

FIG. 5 is a flowchart illustrating an example of the process flow including the steps executed by the eighth processing section 158 to the tenth processing section 160. In FIG. 5, the same process steps as those shown in FIGS. 2 and 3 are indicated by the same reference characters.

After the step (S11) in which the vehicle is connected to the external server 200 (see FIG. 1) by the communication device 112 and a computing task is acquired, the cost B1 and the cost B2 are estimated (S31), which are required when the computing task is processed and when the computing task is not processed, respectively. Then, it is determined whether or not B1<B2 (S32). If B1 is not<B2 (No) in the determination (S32), there is no cost benefit in processing a computing task with the general purpose computing device 111. If B1 is not<B2, the control device 113 may be programmed to cause the process to return to the step of acquiring a computing task (S11). If B1<B2 (Yes) in the determination (S32), there is a cost benefit in processing a computing task with the general purpose computing device 111. Referring to the flowchart of FIG. 5, if B1<B2 (Yes), the steps (S13, S22) are performed, in which it is determined whether there is an excessive processing power and a surplus electric power. Then, if there is an excessive processing power and also there is a surplus electric power, the general purpose computing device 111 is allowed to process the computing task (S15).

Here, if B1<B2, it is possible that the step (S21) of acquiring a surplus electric power may be modified so that the surplus electric power is increased in the step (S21) of acquiring a surplus electric power.

More specifically, if B1<B2, there is an advantage in costs even when the fuel is consumed to generate electric power to preferentially allow the general purpose computing device 111 to perform the processing. For this reason, as far as there is an advantage in costs and also no adverse effect arises on the driving of the vehicle 100, the control device 113 may be configured to allow the general purpose computing device 111 to consume the electric power stored in electrical storage device 114 to perform the processing. It is also possible that, as far as there is an advantage in costs and also no adverse effect arises on the driving of the vehicle 100, the control device 113 may be programmed to cause the vehicle 100 to deliberately consume the fuel to generate electric power.

Thus, when there is an advantage in costs, the user is able to obtain a higher profit than the fuel cost for the consumed fuel by causing the general purpose computing device 111 to process the computing task. For this reason, in the step (S21) of acquiring the surplus electric power, the electric power acquired as the surplus electric power may be calculated to be greater so that the general purpose computing device 111 can perform processing using the electric power stored in the electrical storage device 114 actively.

For example, when the SOC of the electrical storage device 114 is allowed to drop down to about 50% to about 60%, the amount of discharge with which the SOC of the electrical storage device 114 is decreased to 60% is acquired as the surplus electric power (Y1) in the step (S21) of acquiring a surplus electric power (Y1). That is, the electric power generated is not stored but is set to be a surplus electric power within a predetermined permissible range. Then, in the determination step (S22), it is determined whether the surplus electric power (Y1) acquired here is greater than a predetermined electric power. Then, if it is determined that the surplus electric power (Y1) is greater than the predetermined electric power in the determination (S22), the general purpose computing device 111 processes the computing task. In this case, if the electric power stored in the electrical storage device 114 is consumed and the SOC of the electrical storage device 114 is lowered to less than 50%, the fuel may be consumed to generate electric power. For example, the control device 113 may include a processing section programmed to produce a surplus electric power by consuming the fuel to generate electric power, when appropriate, so as to maintain the SOC of the electrical storage device 114 to be higher than 60% and to cause the general purpose computing device 111 to continue the processing of the computing task.

It should be noted that a greater consumption of fuel may be a cause of poor fuel economy. For this reason, it is possible that a plurality of control modes may be prepared about what timing the general purpose computing device 111 should process the computing task, and the user may select one of the modes therefrom.

For example, it is possible to prepare a control mode in which, in such cases where there is a cost benefit as described above, power generation is performed appropriately to produce a surplus electric power and the general purpose computing device 111 is allowed to process the computing task actively so as to obtain a reward from the processing more preferentially rather than to consume fuel.

It is also possible to prepare a control mode programmed to control the vehicle 100 so as to reduce the fuel consumption rather than to obtain the reward.

In addition, it is also possible to prepare a control mode programmed to control the timing of causing the general purpose computing device 111 to process the computing task from the viewpoints of adjusting the SOC of the electrical storage device 114 to be within a predetermined range irrespective of cost benefits to achieve high efficiency in charging and discharging of the electrical storage device 114 and also prolonging the life time of the electrical storage device 114.

Next, a computing system that provides such computing tasks will be described below.

As illustrated in FIG. 1, the external server 200, serving as a host server of the computing system, includes a communication device 210, an A1 memory storage unit 211, an A2 memory storage unit 212, an A3 memory storage unit 213, an A4 memory storage unit 214, and an A5 memory storage unit 215, and a payment processing unit 221. Herein, each of the memory storage units of the external server 200 serves the function of storing a predetermined group of information. Herein, the characters "A1" to "A5" are added to the names of the memory storage units in order to differentiate the memory storage units. The characters "A1" to "A5" are added merely for the purpose of differentiating between the memory storage units, and they do not carry any particular meaning. The A1 memory storage unit 211, the A2 memory storage unit 212, the A3 memory storage unit 213, the A4 memory storage unit 214, and the A5 memory, storage unit 215 are distinguished by the information stored therein. Physically, the memory storage units 211 to 215 may be configured in the same memory storage device.

Here, the communication device 210 is preferably configured to be data-communicatively connected to a vehicle associated with a predetermined user ID through the communication network 202.

The A1 memory storage unit 211 is configured to store computing tasks.

The computing tasks may be various types of computing tasks requiring a large-scale computation, such as genetic analysis, space development, virtual screenings in pharmaceutical fields, combustion simulation for internal combustion engines, and hash function computation for blockchains. In these fields, parallel computing by use of a supercomputer is used as desired. Herein, one computing task may include a single computing task or a computing-task group containing a plurality of tasks that may be processed in parallel by such parallel computing. It is desirable that the A1 memory storage unit 211 store such computing tasks. The A1 memory storage unit 211 may also store, in association with the computing tasks, approximate amounts of computation for the computing tasks and deadlines by which the computing tasks should be completed.

The A2 memory storage unit 212 is configured to store task IDs associated with the computing tasks stored in the A1 memory storage unit 211. The task IDs are pieces of information to identify the computing tasks, which are assigned one to one to the computing tasks. In this computing system, the computing tasks are identified on a one-to-one basis by the task IDs.

The A3 memory storage unit 213 is configured to store rewards associated with the task IDs. Each of the rewards may be a reward that is offered for a processing result for a computing task. The computing tasks may be set in a project with high public benefit or high public interest, such as genetic analysis of intractable diseases and space development. In such cases, the processing may be performed as a part of charity activity or as a non-profit activity by individuals or legal entities. Thus, it is possible that the reward is set to zero, assuming that the processing for a computing task may be carried out by volunteers. The reward may also be paid by virtual currency or the like not just by cash. The reward may be customer loyalty points or the like that are eligible for particular goods or services. For example, the reward may be loyalty points that can be used for purchasing fuel for the vehicle 100.

The A4 memory storage unit 214 may store user IDs. The user IDs are pieces of information to identify the users who use the computing system. For example, a user who uses this computing system may be the owner of a vehicle. This computing system may be a system that enables the users to obtain a reward as a motivation for processing a computing task. For this reason, it is desirable that the user IDs be stored in the external server 200 (host server) in association with pieces of information relating to the users, such as methods of paying a reward to the users.

The A5 memory storage unit 215 may be configured to store one of the user IDs, one of the task IDs, and a processing result in association with each other that are acquired from the vehicle 100 through the communication network 202. The just-mentioned processing result is a processing result obtained for one of the computing tasks that is associated with the one of the task IDs.

The external server 200 (host server) is connected to a plurality of vehicles through the communication network 202. The external server 200 receives respective processing results from the plurality of vehicles. When this is the case, it is desirable that the A5 memory storage unit 215 be configured to store, corresponding to a processing result, which of the computing tasks the processing result is processed for, and a task ID and a user ID for identifying the vehicle that processed the computing task, in association with the processing result. Thus, it is desirable that the external server 200 be configured to acquire the processing result for a computing task, and also pieces of information from the vehicle 100 by bidirectional communication so that the user ID and the task ID can be identified, and to store the user ID, the task ID, and the processing result in the A5 memory storage unit 215 in association with each other.

The payment processing unit 221 is programmed to identify one of the rewards stored in the A3 memory storage unit 213 based on the task ID that is associated with the processing result by the A5 memory storage unit 215. In addition, the payment processing unit 221 is programmed to execute a process for identifying the user ID that is associated with the processing result by the A5 memory storage unit, and paying the reward. Such a payment processing unit 221 makes it possible to construct a system such that after receiving a processing result, the reward can be paid appropriately to the user identified by the user ID.

Thus, the external server 200 provides the vehicle 100 with a computing task and also receives the processing result for the computing task. It is desirable that the external server 200 be programmed so that the reward for the processing result received from the vehicle 100 can be, paid to the user. Although not shown in the drawings, the computing tasks provided for the vehicle 100 by the external server 200 may be various types of computing tasks, such as genetic analysis, space development, and virtual screenings in pharmaceutical fields. Such a computing task may be provided to the external server 200 as either a paid or a non-paid computing task from various research institutes and the like. When the computing task is a paid one, the external server 200 sends the processing result received from the vehicle 100 to the provider of the computing task, such as the research institute that has provided the computing task to the external server 200. The provider, such as a research institute, pays the compensation for the received processing result to the external server 200. Thus, the external server 200 may be connected to a plurality of vehicles 100 so that it can utilize the excessive processing power of the general purpose computing devices 111 in the plurality of vehicles 100. This enables the external server 200 to provide a parallel computing device that is comparable to a supercomputer.

Various embodiments of the vehicle and the computing system according to the present disclosure have been described hereinabove. The embodiments of the vehicle and the computing system that have been described herein do not limit the scope of the present invention, unless specifically stated otherwise.

What is claimed is:

1. A vehicle comprising:
   a general purpose computing device;
   a communication device; and
   a control device;
   the control device comprising:
   a first memory storage section configured to store a computing task acquired from an external server through a communication network by the communication device;
   a second memory storage section configured to store a processing result processed by the general purpose computing device;
   a first processing section programmed to acquire an excessive processing power of the general purpose computing device;
   a second processing section programmed to cause the general purpose computing device to process the computing task stored in the first memory storage section and store the processing result in the second memory storage section if the excessive processing power acquired by the first processing section is greater than a predetermined processing power; and
   a third processing section programmed to cause the communication device to send the processing result stored in the second memory storage section to the external server or another external server.

2. The vehicle according to claim 1, further comprising an electrical storage device; and wherein
   the control device further comprises
   a fourth processing section programmed to acquire a surplus electric power that is unable to be utilized by the electrical storage device, and wherein
   the second processing section is programmed to cause the general purpose computing device to process the computing task stored in the first memory storage section if the surplus electric power acquired by the fourth processing section is greater than a predetermined electric power and the excessive processing power acquired by the first processing section is greater than the predetermined processing power.

3. The vehicle according to claim 2, further comprising:
   an electric generator; and wherein
   the surplus electric power acquired by the fourth processing section includes a portion of electric power generated by the electric generator that is unable to be stored in the electrical storage device.

4. The vehicle according to claim 2, further comprising:
   a regenerative device incorporating an electric generator; and wherein
   the surplus electric power acquired by the fourth processing section includes a portion of electric power generated by the regenerative device that is unable to be stored in the electrical storage device.

5. The vehicle according to claim 4, wherein:
   the control device further comprises:
   a fifth processing section configured to predict a travel route; and a sixth processing section programmed to estimate a regenerative energy expected to be obtained in the travel route predicted by the fifth processing section; wherein the surplus electric power acquired by the fourth processing section includes a portion of electric power stored in the electrical storage device that is to be consumed in advance, based on the regenerative energy estimated by the sixth processing section.

6. The vehicle according to claim 2, further comprising:
an engine; and
a mechanism that causes a mechanical power of the engine to drive an electric generator; and wherein:
the surplus electric power acquired by the fourth processing section includes a portion of electric power generated by causing the mechanical power of the engine to drive the electric generator, the portion of electric power being unable to be stored in the electrical storage device.

7. The vehicle according to claim 2, further comprising:
a seventh processing section configured to estimate a required electric power required to process the computing task; and wherein
the second processing section is programmed to cause the general purpose computing device to process the computing task if the surplus electric power acquired by the fourth processing section is greater than the required electric power estimated by the seventh processing section.

8. The vehicle according to claim 1, further comprising:
a third memory storage section configured to associate a reward for the processing result with the computing task stored in the first memory storage section, and store the reward for the processing result;
an eighth processing section programmed to estimate a cost B1 that is required when the computing task is processed;
a ninth processing section programmed to estimate a cost B2 that is required when the computing task is not processed; and
a tenth processing section programmed to cause the second processing section to process the computing task if the cost B1 estimated by the eighth processing section is less than the cost B2 estimated by the ninth processing section.

9. The vehicle according to claim 1, further comprising:
a fourth memory storage section configured to store a user ID; and wherein:
the first memory storage section configured to further store a task ID in association with the computing task; and
the third processing section is programmed to associate the task ID and the user ID, which is stored in the fourth memory storage section, with the processing result, and cause the communication device to send, along with the processing result, the associated task ID and the associated user ID to the external server or another external server.

* * * * *

UNITED STATES PATENT AND TRADEMARK OFFICE
CERTIFICATE OF CORRECTION

PATENT NO. : 10,776,168 B2
APPLICATION NO. : 16/161582
DATED : September 15, 2020
INVENTOR(S) : Ryo Kanada Page 1 of 1

It is certified that error appears in the above-identified patent and that said Letters Patent is hereby corrected as shown below:

On the Title Page

Item (72), inventor 1, city, delete "Toyota" and insert --Toyota-shi Aichi-ken--, therefor In the Specification In Column 15, Line(s) 28, after "section", delete "."

In Column 18, Line(s) 18, after "memory", delete ","

In Column 19, Line(s) 47, after "be", delete ","

Signed and Sealed this
Nineteenth Day of January, 2021

Andrei Iancu
*Director of the United States Patent and Trademark Office*